United States Patent
Meier-Magruder et al.

(10) Patent No.: US 10,877,988 B2
(45) Date of Patent: Dec. 29, 2020

(54) REAL-TIME CHANGE DATA FROM DISPARATE SOURCES

(71) Applicant: Microsoft Technology Licensing, LLC, Redmond, WA (US)

(72) Inventors: Karin Meier-Magruder, Bellevue, WA (US); Shawn Becker, Seattle, WA (US); Charles McDaniels, Renton, WA (US); George Ringer, Mercer Island, WA (US); Daniel Dawson, Bothell, WA (US); David Wells, Maltby, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 14/956,377

(22) Filed: Dec. 1, 2015

(65) Prior Publication Data
US 2017/0154086 A1   Jun. 1, 2017

(51) Int. Cl.
*G06F 16/25* (2019.01)
*G06F 16/248* (2019.01)

(52) U.S. Cl.
CPC .......... *G06F 16/258* (2019.01); *G06F 16/248* (2019.01); *G06F 16/252* (2019.01)

(58) Field of Classification Search
CPC ......... G06F 17/30569; G06F 17/30076; G06F 17/30289; G06F 17/30578
See application file for complete search history.

(56) References Cited

U.S. PATENT DOCUMENTS

| | | |
|---|---|---|
| 5,287,505 A | 2/1994 | Calvert et al. |
| 5,638,514 A | 6/1997 | Yoshida et al. |
| 6,202,199 B1 | 3/2001 | Wygodny et al. |
| 6,718,489 B1 | 4/2004 | Lee et al. |
| 8,811,595 B2 | 8/2014 | Werth et al. |
| 8,984,134 B2 | 3/2015 | Ashok et al. |
| 9,898,497 B2 * | 2/2018 | Ruiz Velazquez ......... G06F 17/30371 |

(Continued)

FOREIGN PATENT DOCUMENTS

WO     2000068793 A1     11/2000

OTHER PUBLICATIONS

IPEA European Patent Office, Second Written Opinion Issued in PCT Application No. PCT/US2016/063720, dated May 12, 2017. WIPO, 12 pages.

(Continued)

*Primary Examiner* — James Trujillo
*Assistant Examiner* — Kurt A Mueller
(74) *Attorney, Agent, or Firm* — Alleman Hall Creasman & Tuttle LLP

(57) ABSTRACT

In one embodiment, a change data monitoring system may gather change data from multiple data sources each with a different proprietary source format. The change data monitoring system may receive a change data report having a change data set describing changes made to an online system from a data source of a data source set tracking the online system using multiple proprietary source formats. The change data monitoring system may convert the change data set from a proprietary source format to a standardized data presentation format. The change data monitoring system may present the change data set to a user in the standardized data presentation format.

19 Claims, 14 Drawing Sheets

(56) References Cited

U.S. PATENT DOCUMENTS

| | | | |
|---|---|---|---|
| 2002/0144174 A1* | 10/2002 | Nwabueze | G06F 17/30867 714/1 |
| 2004/0236820 A1 | 11/2004 | Flocken | |
| 2008/0127108 A1 | 5/2008 | Ivanov et al. | |
| 2009/0193298 A1 | 7/2009 | Mukherjee | |
| 2010/0218031 A1 | 8/2010 | Agarwal et al. | |
| 2013/0185701 A1 | 7/2013 | Martick | |
| 2013/0219232 A1 | 8/2013 | Embree et al. | |
| 2013/0305092 A1 | 11/2013 | Jayachandran et al. | |
| 2015/0058681 A1 | 2/2015 | Lingannapeta et al. | |
| 2015/0332316 A1* | 11/2015 | Cohen Kassko | G06Q 30/0243 705/14.45 |
| 2016/0261727 A1* | 9/2016 | Yang | H04L 65/4069 |
| 2016/0292206 A1* | 10/2016 | Ruiz Velazquez | G06F 16/2365 |

OTHER PUBLICATIONS

"International Preliminary Report on Patentability Issued in PCT Application No. PCT/US2016/063720", dated Aug. 16, 2017, 13 Pages.

ISA European Patent Office, International Search Report and Written Opinion Issued in PCT Application No. PCT/US2016/063720, dated Feb. 28, 2017, WIPO, 16 Pages.

Gabel, et al., "Latent Fault Detection in Large Scale Services", In Proceedings of 42nd Annual IEEE/IFIP International Conference on Dependable Systems and Networks, Jun. 25, 2012, 12 pages.

Wright, Alex., "Contemporary Approaches to Fault Tolerance", In Proceedings of communications of the ACM, vol. 52, Issue 7, Jul. 2009, pp. 13-15.

"Office Action Issued in European Patent Application No. 16816056. 2" dated Mar. 14, 2019, 7 Pages.

* cited by examiner

| BATCH ID 502 | SERVICE ID 504 | SERVER ID 506 | USER 508 | CHANGE DATA 510 | START TIME 512 | STOP TIME 514 | TYPE 516 | ENV 518 | STATUS 520 |
|---|---|---|---|---|---|---|---|---|---|

*500*
Figure 5

| TIMING 680 | TYPE 610 | CHANGE 620 | START 630 | END 640 | USER 650 | SERVER 660 | ENV 670 | PERFORMANCE GRAPH 690 |
|---|---|---|---|---|---|---|---|---|
| PAST 682 | TYPE 610 | CHANGE 620 | START 630 | END 640 | USER 650 | SERVER 660 | ENV 670 | |
| | TYPE 610 | CHANGE 620 | START 630 | END 640 | USER 650 | SERVER 660 | ENV 670 | |
| | TYPE 610 | CHANGE 620 | START 630 | END 640 | USER 650 | SERVER 660 | ENV 670 | |
| PRESENT 684 | TYPE 610 | CHANGE 620 | START 630 | END 640 | USER 650 | SERVER 660 | ENV 670 | |
| | TYPE 610 | CHANGE 620 | START 630 | END 640 | USER 650 | SERVER 660 | ENV 670 | |
| FUTURE 686 | TYPE 610 | CHANGE 620 | START 630 | END 640 | USER 650 | SERVER 660 | ENV 670 | |
| | TYPE 610 | CHANGE 620 | START 630 | END 640 | USER 650 | SERVER 660 | ENV 670 | |
| | TYPE 610 | CHANGE 620 | START 630 | END 640 | USER 650 | SERVER 660 | ENV 670 | |

REAL-TIME CHANGE DATA FROM DISPARATE SOURCES

BACKGROUND

An online system is a network service or software as a service that is used across multiple network devices. The online system may encompass multiple providers and services each having multiple servers. Each of these services or providers may have multiple changes made to the performance conditions and underlying code being executed. Each server and provider may have a proprietary format for storing records of these changes. The online service may collect the change data describing changes made to the executed code or data from each provider or server, each in a different proprietary format.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to gathering change data from multiple data sources each with a different proprietary source format. The change data monitoring system may receive a change data report having a change data set describing changes made to an online system from a data source of a data source set tracking the online system using multiple proprietary source formats. The change data monitoring system may convert the change data set from a proprietary source format to a standardized data presentation format. The change data monitoring system may present the change data set to a user in the standardized data presentation format.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 5 illustrates, in a block diagram, one embodiment of a standardized data presentation format for a change data report.

FIG. 6 illustrates, in a block diagram, one embodiment of a user interface for displaying a change data set.

DETAILED DESCRIPTION

Figure 1:
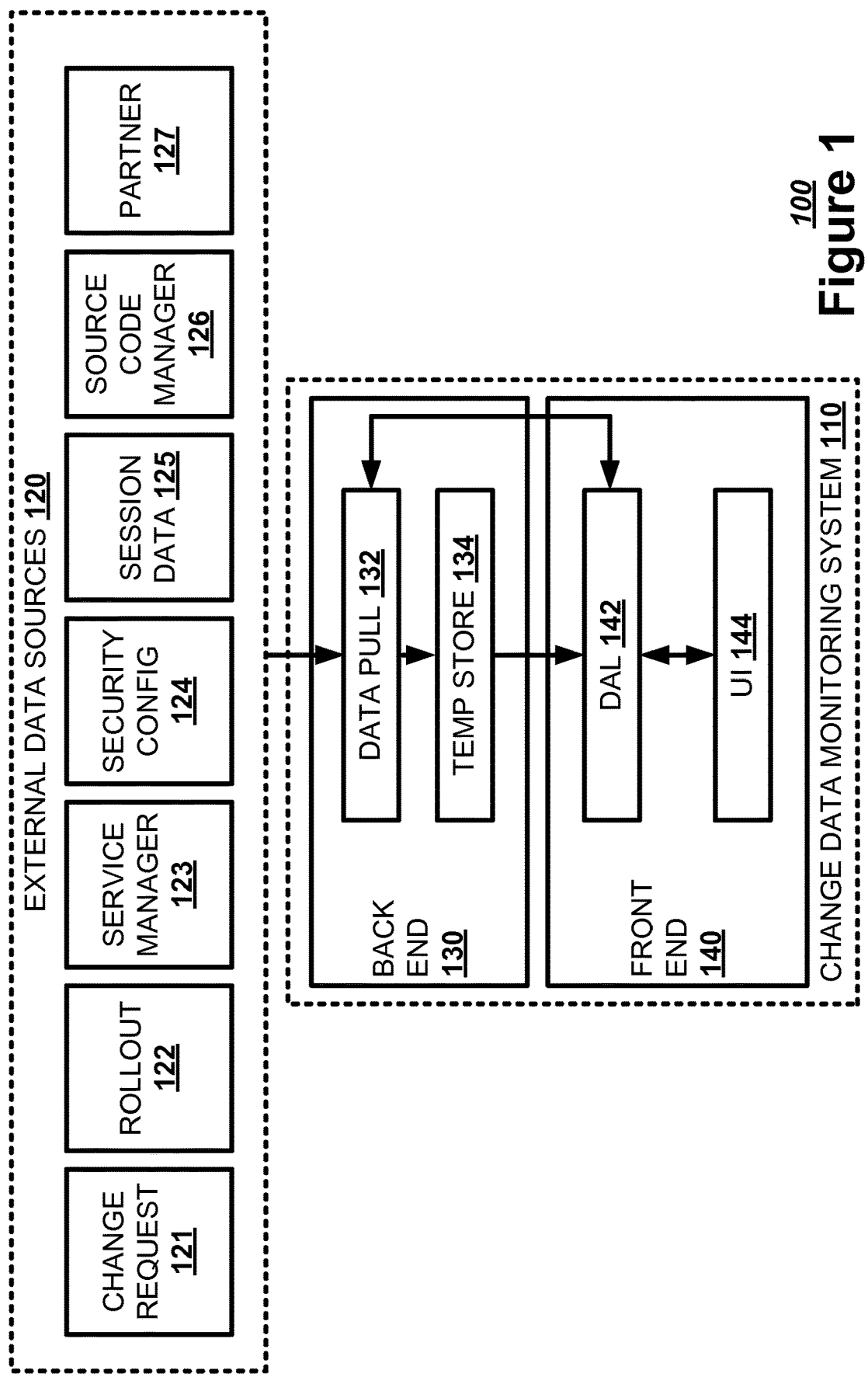
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a change data monitoring system, a computing device, or a machine-implemented method.

In one embodiment, a change data monitoring system may gather change data from multiple data sources each with a different proprietary source format. The change data monitoring system may receive a change data report having a change data set describing changes made to an online system from a data source of a data source set tracking the online system using multiple proprietary source formats. The change data monitoring system may convert the change data set from a proprietary source format to a standardized data presentation format. The change data monitoring system may present the change data set to a user in the standardized data presentation format.

Operating an online system may result in time and energy spent observing and collecting data from a variety of services, servers, and infrastructure to detect issues with the online system. These data points usually may help determine effect but may not be as effective in determining root cause. Since a large percentage of service interruptions in an online system may be attributed to change, a change data monitoring system may be used to get a quick and clear understanding of the changes happening in an environment at a given time. Because several different systems may initiate, track, and collect change data, an administrator may waste precious time during an incident inspecting each system's reporting function separately to get the holistic view of the change data set. To reduce the amount of time spent gathering and inspecting change data, a change data monitoring system may enable collection, aggregation, and quick observation of planned records of change and auditable artifacts of change, referred to collectively as "change data", in near real time. An administrator may then pinpoint the cause of an incident with greater speed and precision to increase mean time to resolution of the issue and ultimately reduce service disruption time.

The change data monitoring system may independently execute data pulls following a defined standard schema. The change data monitoring system may store data in batches with an indicator of whether a batch is current for a given data source. If a single data source fails to pull data, the change data monitoring system may avoid blocking any other data source. The change data monitoring system may keep the last copy of data pulled for the affected data source available if a data pull fails. The change data monitoring system may control data pulls by handling executing the pull per configured interval, updating batch identifiers and status, and cleaning up stale data from old batches. The change data monitoring system may define and update a set of source data, such as start time and stop time, record type, environment, status, and other data points, to standard data mappings that may be different per data type and data source. The change data monitoring system may allow for common sorting and filtering across change data sets. The change data monitoring system may present change data sets to the user in an initial grouping by environment or by timing data. The timing data may separate actions into a past data action, a current data action, and a future scheduled data action. The change data monitoring system may initially sort and present the change data chronologically to start. For data sources with a web interface, the change data monitoring system may provide a link to that data source for a given record, allowing the user to see the details of the record in the data source with one click.

FIG. 1 illustrates, in a block diagram, one embodiment of a data network 100 that monitors change data in an online system. A change data monitoring system 110 may collect in a centralized data location change data from one or more external data sources 120, each having a proprietary format for storing any change data registered by the data source. For the example, an external data source 120 may be a change request storage 121, a rollout server 122, a service manager 123, a security configuration storage 124, a session data storage 125, a source code manager 126, a partner data storage 127, or other data storage or servers. A change request storage 121, such as MSChange, stores a record of each change to the system requested by an administrator or other user. A rollout server 122, such as AutoPilot, stores rollout information for applications, data, and configuration files. A service manager 123 stores change records, incident records, and other recorded events. A security configuration storage 124, such as Tripwire, stores security configuration data for servers, databases, and network devices. A session data storage 125, such as Arcsight, stores logon and logoff data from servers. A source code manager 126, such as Team Foundation Server, performs version control for the source code of the software being executed. A partner data storage 127 stores data for any changes made to software that interacts with the online system but is outside the direct control of the online system.

The change data monitoring system 110 may have a back end 130 and a front end 140. The back end 130 may gather the change data from the external data sources 120. The back end 130 may execute a data pull module 132 that schedules data pull requests to be sent to the external data sources 120 to request the change data. The data pull module 132 may send those data pull requests to the external data sources 120. The data pull module 132 may process any change data reports describing the change data received from the external data sources 120. The data pull module 132 may then store the change data sets in the change data reports in a temporary data store 134.

The front end 140 may present the change data to a user. A data access layer (DAL) 142 may retrieve any of the change data sets requested by a user from the temporary data store 134. The data access layer 142 may then provide the change data sets to the user interface 144 for presentation to the user. The user may submit specific change data requests via the user interface 144. The data access layer 142 may process specific change data requests from a user and contact the data pull module 132 to schedule the specific change data requests from the external data sources 120.

Figure 2:
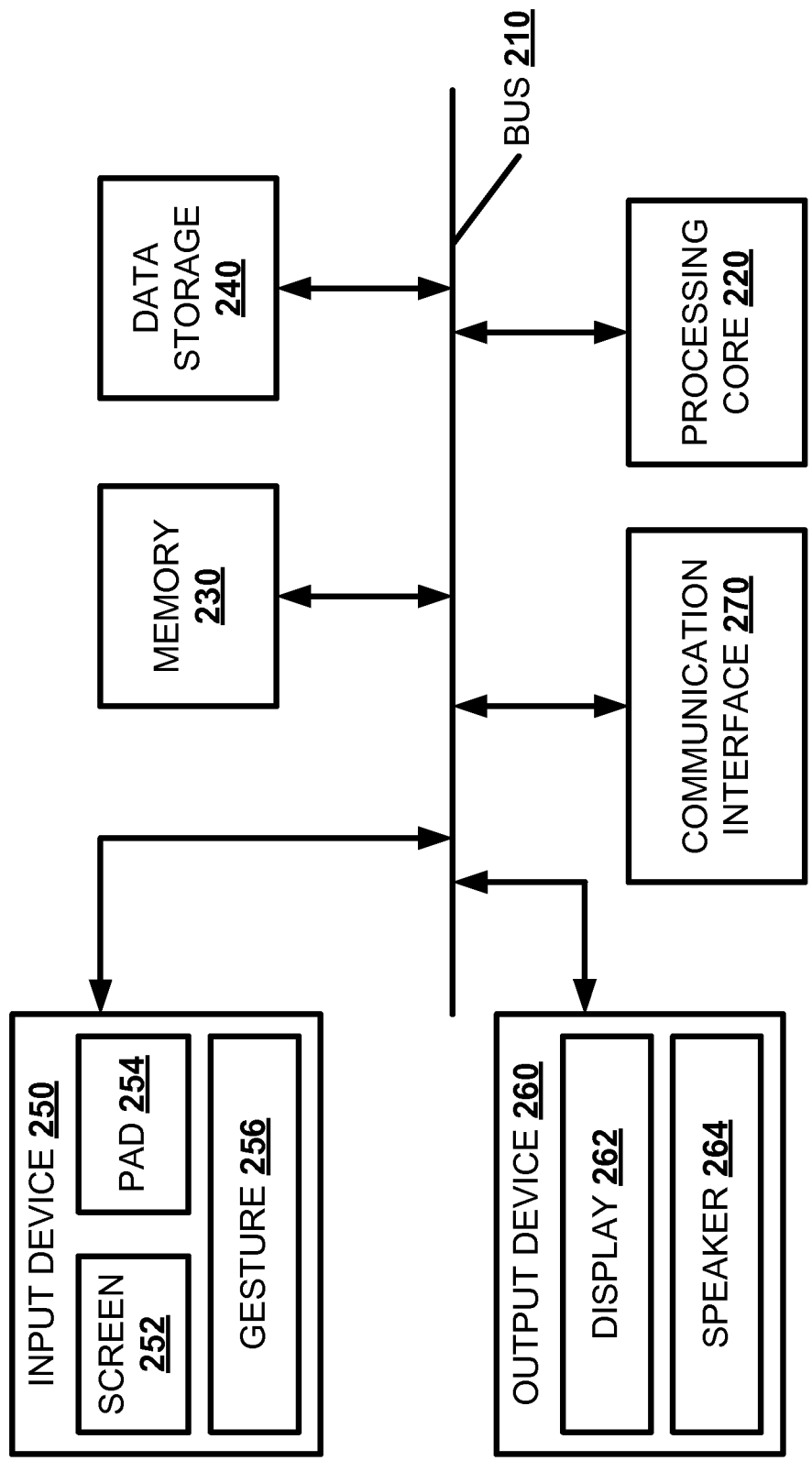
FIG. 2 illustrates, in a block diagram, one embodiment of a computing device.

FIG. 2 illustrates a block diagram of an exemplary computing device 200 which may act as a change data monitoring system or a data source. The computing device 200 may combine one or more of hardware, software, firmware, and system-on-a-chip technology to implement a change data monitoring system or a data source. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may have at least one processor configured to convert the change data set from a proprietary source format to a standardized data presentation format. The processing core 220 may execute a data pull module to schedule a data pull for the data source. The processing core 220 may discard a grand predecessor change data set received from the data source prior to a predecessor change data set and the change data set from the data source upon receiving the change data set. The processing core 220 may organize the change data set based upon a data environment for the data source. The processing core 220 may organize the change data set as at least one of a past data action, a current data action, and a future data action.

The processing core 220 may use the change data set in conjunction with performance metric data for the online system to determine further courses of action. The processing core 220 may correlate a timing of a performance metric failure to the change data set. The processing core 220 may apply a data amelioration action based on a correlation between the change data set and a performance metric failure. A data amelioration action is an action to fix a performance metric failure based on a change to the online system software, such as rolling back a recent change or applying a known patch.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may act as a temporary data store configured to store the change data set. The temporary data store may associate the change data set with a source link to a web interface for the data source. The temporary data store may associate the change data set with a status indicator identifying whether a change data set is within a preset freshness period.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for accessing the external data sources.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display 262, a printer, one or more speakers 264, a headset, a vibrator, or a medium, such as a memory, or a magnetic or optical disk and a corresponding disk drive. A display 262 may present the change data set to a user in the standardized data presentation format.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may receive a change data report having a change data set describing changes made to an online system from a data source of a data source set tracking the online system using multiple proprietary source formats. The communication interface 270 may receive a performance metric from a performance metric monitor describing the performance of an online system. The communication interface 270 may request a data dump from the data source based on a correlation between the change data set and a performance metric failure. The communication interface 270 may automatically alert a system administrator based on a correlation between the change data set and a performance metric failure.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
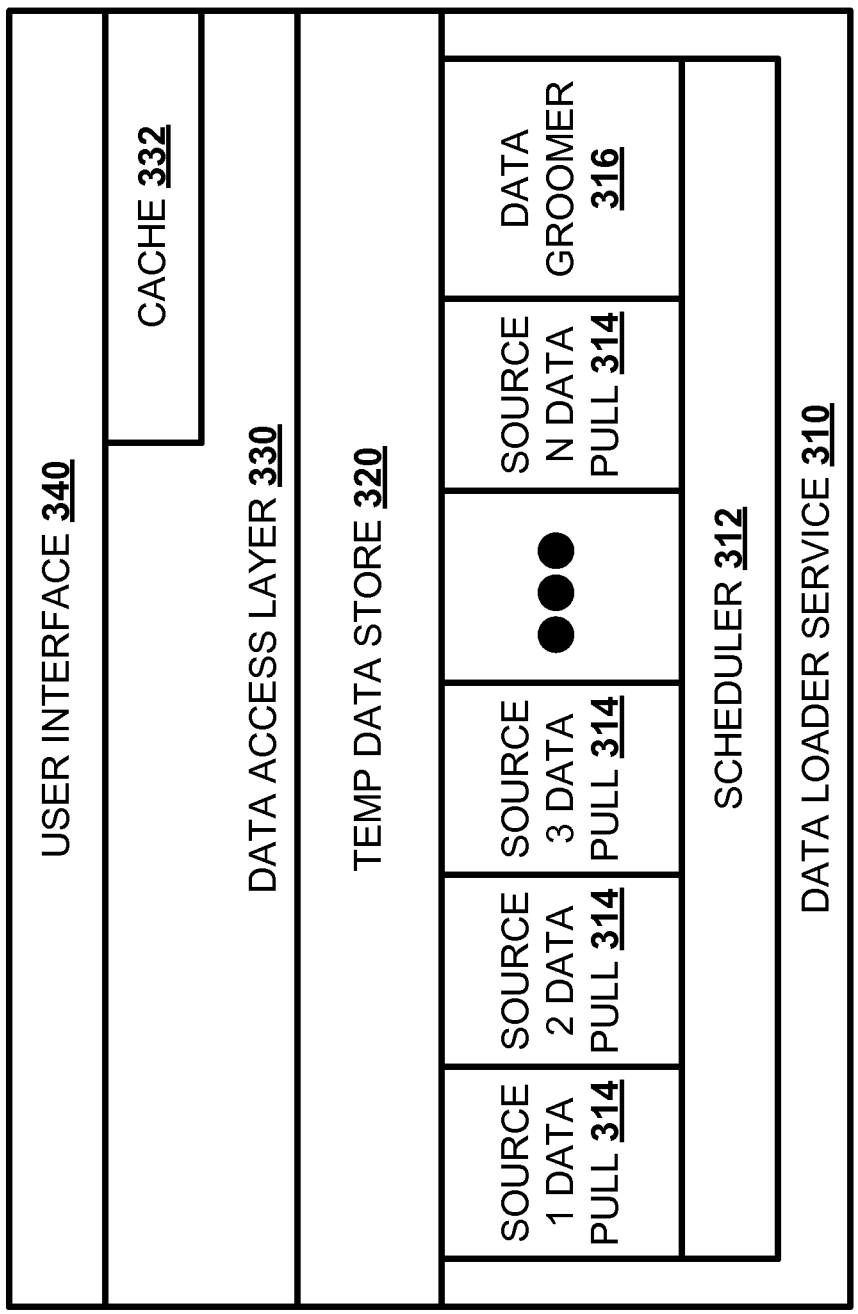
FIG. 3 illustrates, in a block diagram, one embodiment of a computer architecture for a change data monitoring system.

FIG. 3 illustrates, in a block diagram, one embodiment of a computer architecture 300 for a change data monitoring system. The change data monitoring system may have a data loader service 310 configured to acquire change data from a variety of external data sources. The data loader service 310 may have a scheduler 312, a source data pull module 314 for each of the known external data sources, and a data grooming module 316.

The scheduler 312 may schedule data pull requests for the various external data sources. The scheduler 312 may set up timers for each source data pull module 314 to execute the work at an appropriate interval. The scheduler 312 may be agnostic to whether a particular data pull batch succeeds or fails. Success or failure may not affect future batches or any other data pulls scheduled or in progress. The scheduler 312 may track execution durations and write those track execution durations to performance counters.

A source data pull module 314 may interact with the individual data source. The source data pull module 314 may write status and results back to a temporary data store 320 as batches start and end. The source data pull module 314 may send a data pull request to the assigned external data source. Additionally, the source data pull module 314 may handle transformation of data and loading of the data into the data store. The change data monitoring system may represent each source data pull module as a C# class that implements a standard interface. By using a standard interface, the scheduler 312 may interact with any source data pull module 314 in the same way regardless of internal operations. The source data pull module 314 may convert any resulting change data report to a standardized data presentation format from the proprietary source format used by the external data source. Alternately, the source data pull module 314 may include a specification for the standardized data presentation format so that the external data source may convert the proprietary source format to the standardized data presentation format prior to transmission.

The data grooming module 316 may execute data grooming and any other maintenance work scheduled similarly to the source data pull modules 314. The data grooming module 316 may perform data grooming upon a set interval of minutes. Each time the data grooming module 316 runs, the data grooming module 316 may clear the data in each data source table that is at least two batches old. This procedure may insure that no data currently in use is deleted.

The temporary data store 320 may store the transient change data in a structured query language (SQL) format for each external data source. The temporary data store 320 may be optimized for reads while preventing locks due to data imports. The temporary data store 320 may push the responsibility of search and read optimization into a data access layer 330, leaving the temporary data store 320 simple and lightweight.

The data access layer 330 may execute the correlation and aggregation of the change data. The data access layer may implement a cache 332 to keep calls from a user interface 340 fast. Requests from the user interface 340 may hit the cache 332. The data access layer may pre-cache data for before a user accesses the user interface 340. The user interface 340 may allow the user to access the change data.

Figure 4:
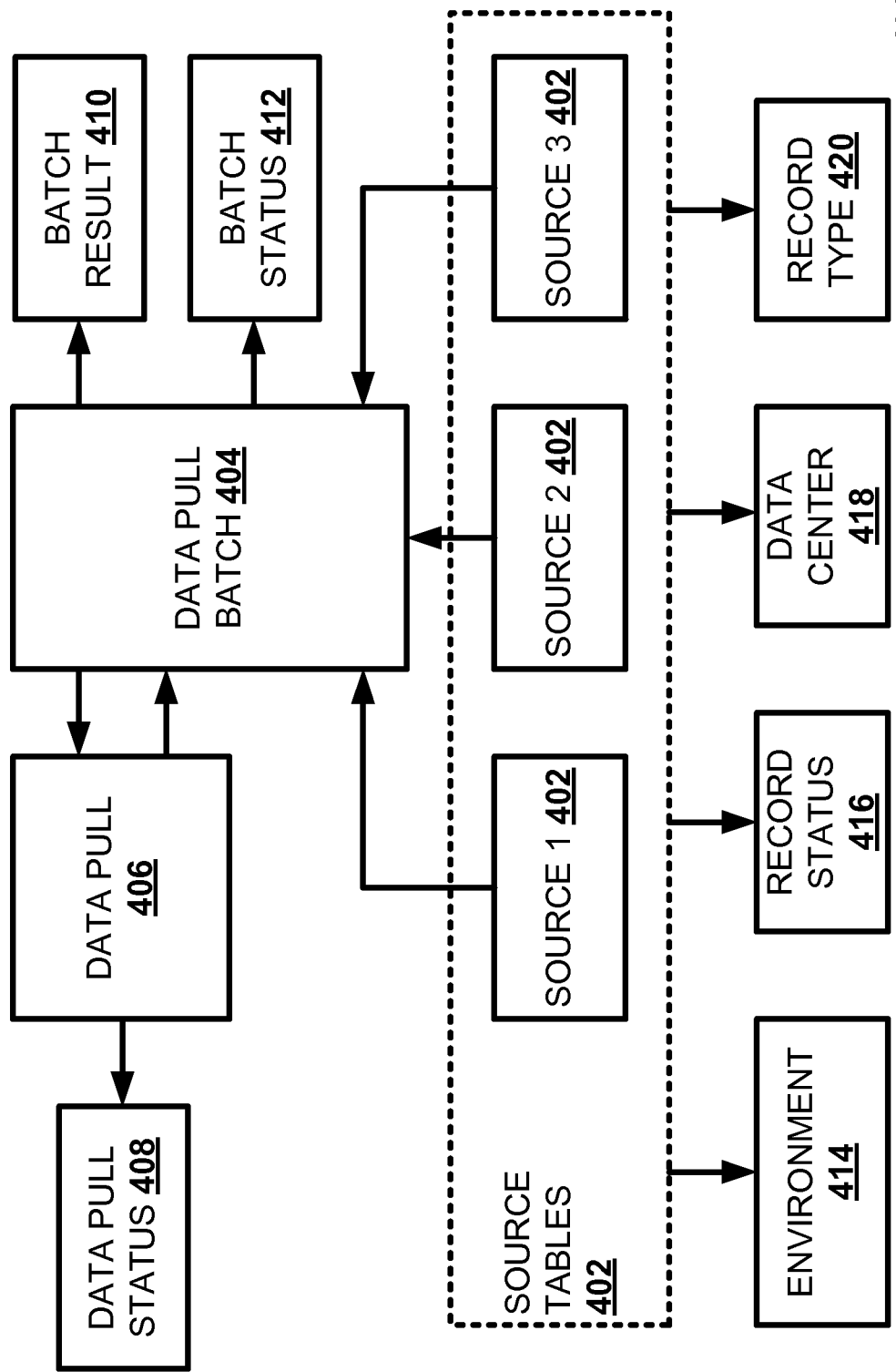
FIG. 4 illustrates, in a block diagram, one embodiment of a data base schema for a temporary data store.

FIG. 4 illustrates, in a block diagram, one embodiment of a database schema 400 for a temporary data store. The temporary data store may have a data source table 402 for each data source that contains records pulled in from each data source. As a new data source is brought online, the data access layer may create a new data source table 402 to hold the data. A data pull batch table 404 may track each time the data pull module extracts data from a given data source. The data source table 402 may store multiple batches, allowing new data to be imported while previously completed batches are accessed. To avoid contention issues, the data access layer may use heavy caching to allow infrequent reads. The data pull table 406 may track the existence of each data source providing data.

Other tables may implemented to facilitated lookup. A data pull status table 408 may provide the status for a change data set. A batch result table 410 may provide the current set of change data reports for that interval. A batch status table 412 may provide the status of the current set of the change data reports for that interval.

On the data source side, the environment table 414 may provide environmental data for each data source. The record status table 416 may provide a status for each data source indicating whether a change report from that data source is current. The data center table 418 may identify the data center for each data source. The record type table 420 may identify the proprietary source format for each data source.

FIG. 5 illustrates, in a block diagram, one embodiment of a standardized data presentation format 500 for a change data report. The change data report may have a batch identifier (ID) 502 indicating the batch of current change data reports. The change data report may have a service identifier 504 identifying the online service and a server identifier 506 identifying the particular server of the online service providing the change data report. The change data report may have a user field 508 identifying the user that ordered the change. The change data report may have the change data set 510 describing the changes made to the online service. The change data report may have a start time field 512 indicating when the change commences and a stop time field 514 indicating when the change was completed. The change data report may have a type field 516 describing the type of change data, possibly indicating the proprietary source format of the change data set. The environment (ENV) field 518 may describe the conditions in which the online service operated. The status field 520 may indicate whether the change data is current, being within at least a preset freshness period.

FIG. 6 illustrates, in a block diagram, one embodiment of a user interface 600 for displaying a change data set. The user interface 600 may display a type field 610 that describes the type of change data being displayed. The user interface 600 may display a change field 620 describing changes made to an online system. The user interface 600 may display a start time field 630 indicating when the change commences and a stop time field 640 indicating when the change was completed. The user interface 600 may have a user field 650 identifying the user that ordered the change. The user interface 600 may have a server field 660 identifying the server providing the change data. The user interface 600 may have an environment field 670 describing the environment under which the change was implemented. The user interface 600 may have a timing field 680, allowing the user to organize the change data by past actions 682 that have already occurred, present actions 684 that are currently happening, and future actions 686 that are scheduled to happen in the future. The user interface 600 may have a performance graph 690 indicating a service performance, such as network latency or processor or memory usage, during the change implementation.

Figure 7:
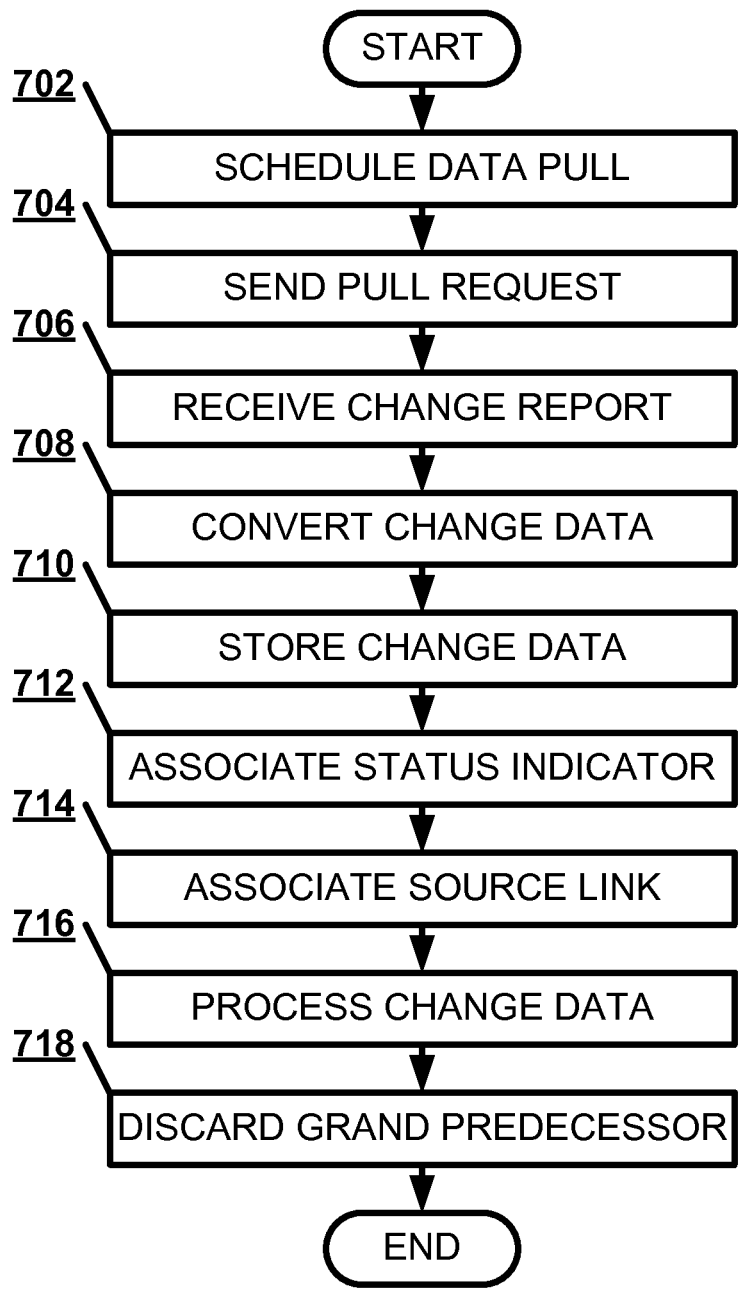
FIG. 7 illustrates, in a flowchart, one embodiment of a method for gathering heterogeneous change data in a change data monitoring system.

FIG. 7 illustrates, in a flowchart, one embodiment of a method 700 for gathering heterogeneous change data in a change data monitoring system. The change data monitoring system may schedule a data pull for the change data set from a data source of a data source set tracking an online system using at least two proprietary source formats (Block 702). The change data monitoring system may send a data pull request to the data source at a scheduled data pull interval (Block 704). The change data monitoring system may receive a change data report having a change data set describing changes made to the online system from the data source of the data source set tracking the online system using multiple proprietary source formats (Block 706). The change data monitoring system may convert the change data set from a proprietary source format to a standardized data presentation format (Block 708). The change data monitoring system may store the change data set in a temporary data store designed to store the change data set no more than a preset storage time period (Block 710). The change data monitoring system may associate the change data set with a status indicator identifying whether the change data set is within a preset freshness period (Block 712). The change data monitoring system may associate the change data set with a source link to a web interface for the data source (Block 714). The change data monitoring system may process the change data set in conjunction with a performance metric to determine a course of action (Block 716). The change data monitoring system may discard a grand predecessor change data set received from the data source prior to a predecessor change data set and the change data set from the data source upon receiving the change data set (Block 718).

Figure 8:
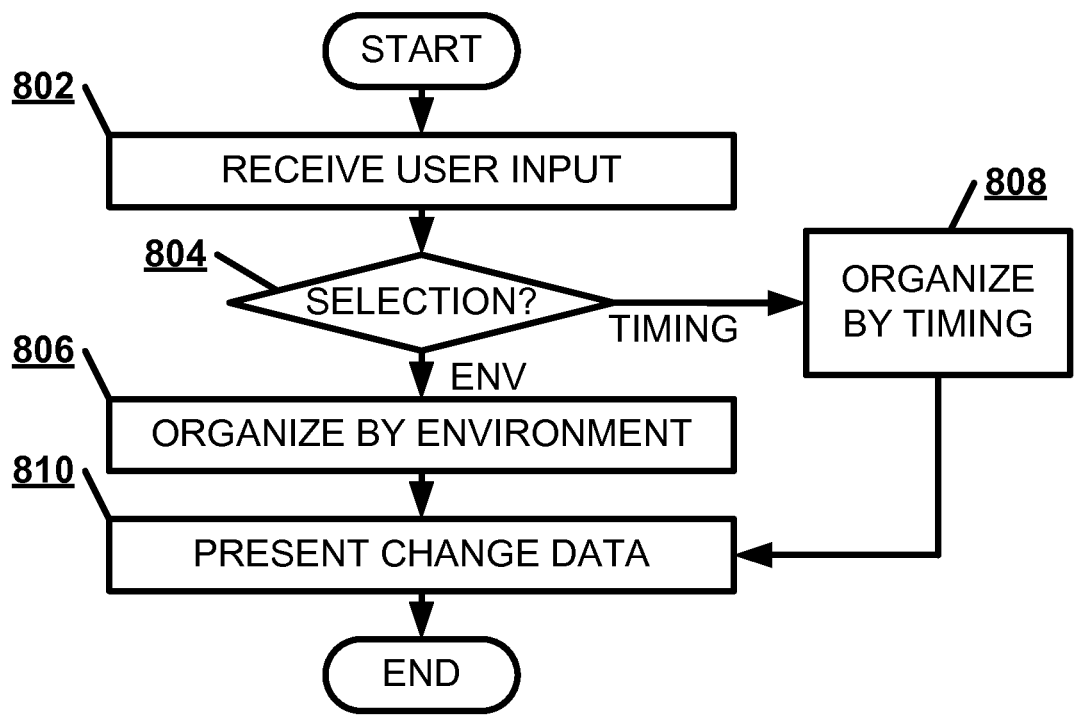
FIG. 8 illustrates, in a flowchart, one embodiment of a method for presenting change data with a change data monitoring system.

FIG. 8 illustrates, in a flowchart, one embodiment of a method 800 for presenting change data with a change data monitoring system. The change data monitoring system may receive a user input indicating a selection of an organization scheme for presenting the change data set (Block 802). If the user input selects organizing by timing (Block 804), the change data monitoring system may organize the change data set as at least one of a past data action, a current data action, or a future data action (Block 806). If the user input selects organizing by environment (Block 804), the change data monitoring system may organize the change data set based upon a data environment for the data source (Block 808). The change data monitoring system may present the change data set to the user in a standardized data presentation format in real-time (Block 810).

Figure 9:
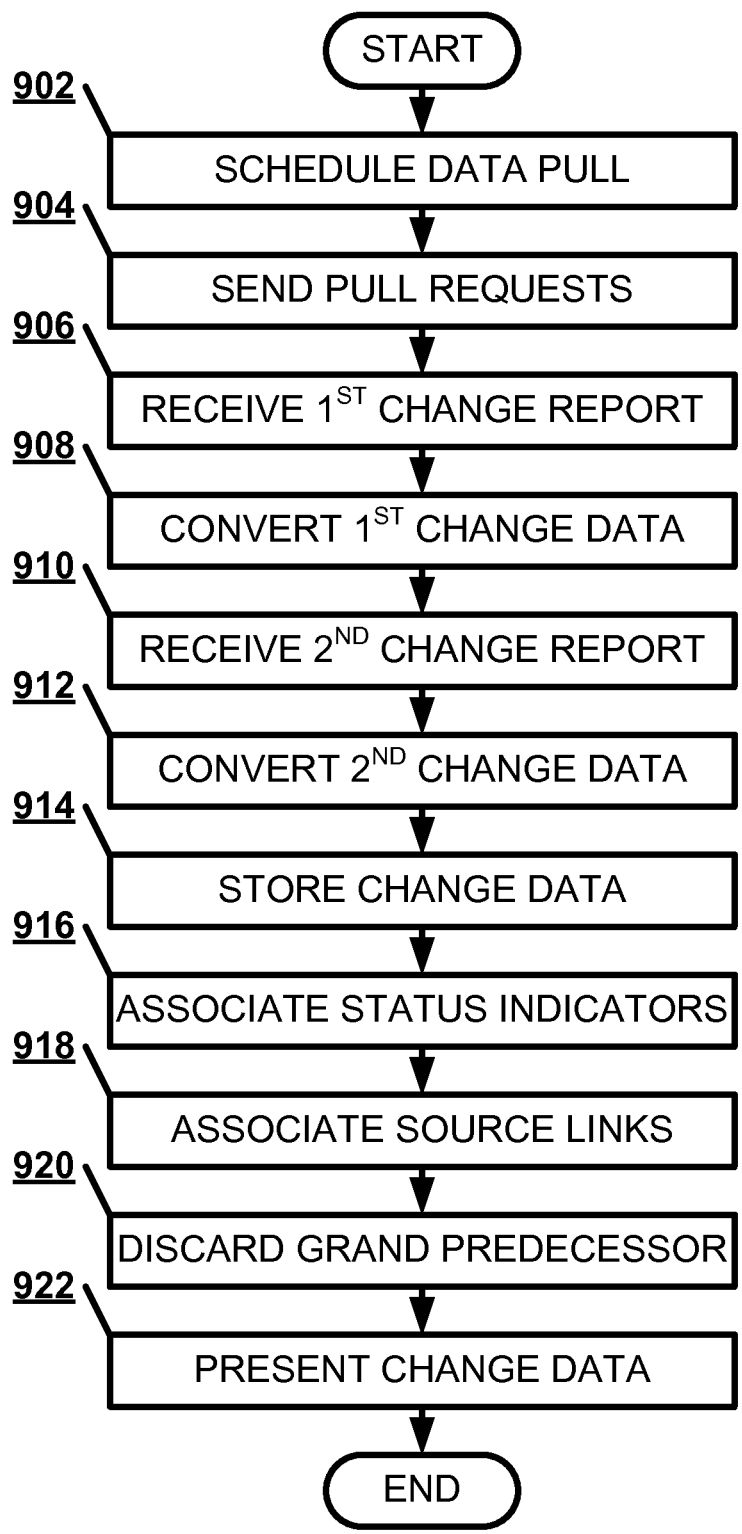
FIG. 9 illustrates, in a flowchart, one embodiment of a method for gathering change data in a change data monitoring system from multiple locations.

FIG. 9 illustrates, in a flowchart, one embodiment of a method 900 for gathering change data in a change data monitoring system from multiple sources. The change data monitoring system may schedule a first data pull for a first data source that uses a first proprietary source format for tracking changes to an online system and a second data pull for a second data source data source that uses a second proprietary source format for tracking changes to the online system (Block 902). The change data monitoring system may send a first data pull request to the first data source at a first scheduled data pull interval and a second data pull request to the second data source at a second scheduled data pull interval (Block 904). The change data monitoring system, acting as a centralized data location, may receive from a first data source a first change data report having a first change data set describing the changes in the first proprietary source format (Block 906). The change data monitoring system may convert the first change data set from a first proprietary source format to a standardized data presentation format (Block 908). The change data monitoring system may receive from a second data source a second change data report having a second change data set describing the changes in a second proprietary source format (Block 910). The change data monitoring system may convert the second change data set from a second proprietary source format to a standardized data presentation format (Block 912). The change data monitoring system may store the first change data set and the second change data set in a temporary data store designed to store each change data set no more than a preset storage time period (Block 914). The change data monitoring system may associate the first change data set with a first status indicator and the second change data set with a second status indicator each identifying whether the associated change data set is within a preset freshness period (Block 916). The change data monitoring system may associate the first change data set with a first source link to a first web interface for the first data source and the second change data set with a second source link to a second web interface for the second data source (Block 918). The change data monitoring system may discard a first grand predecessor change data set received from the first data source prior to a first predecessor change data set and the first change data set from the first data source upon receiving the first change data set and a second grand predecessor change data set received from the second data source prior to a second predecessor change data set and the second change data set from the second data source upon receiving the second change data set (Block 920). The change data monitoring system may present the first change data set and the second change data set in the standardized data presentation format to the user in real-time (Block 922).

Figure 10:
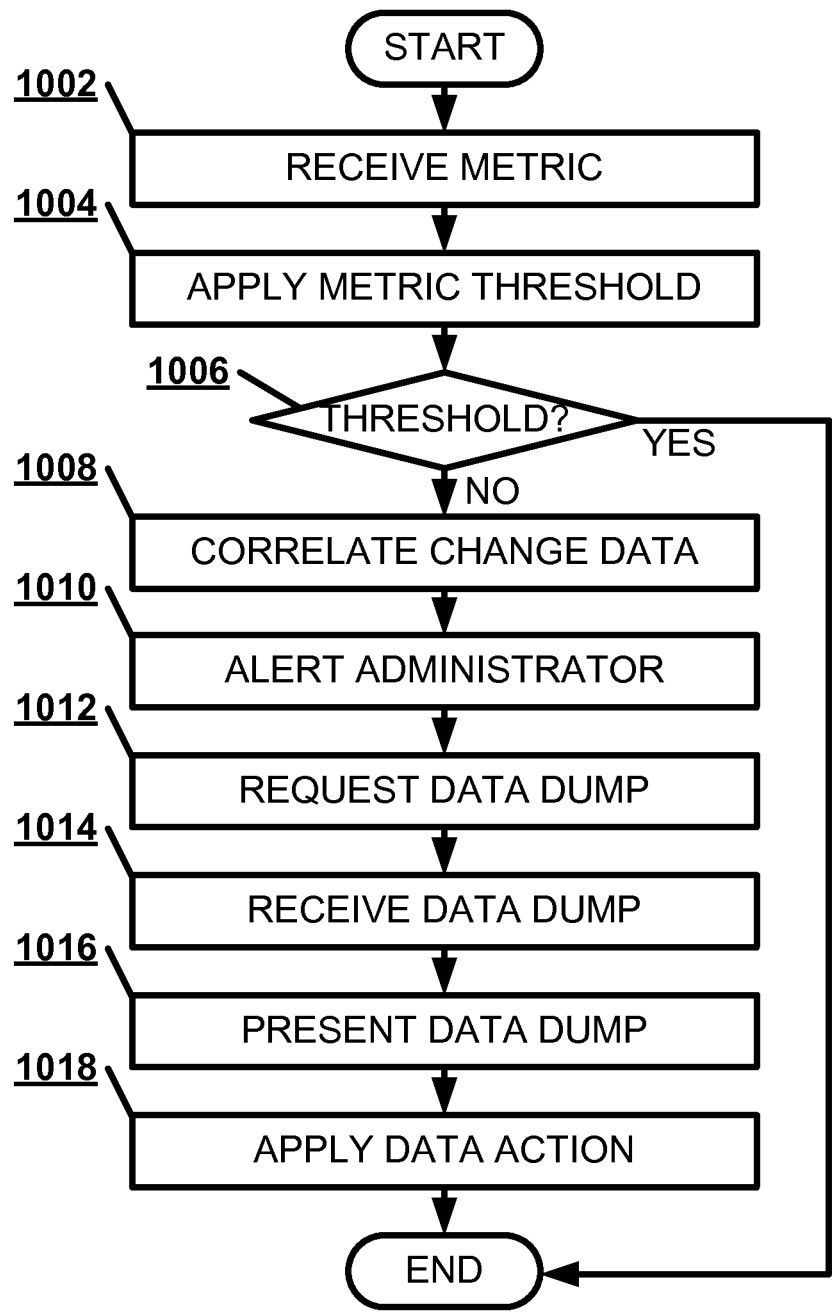
FIG. 10 illustrates, in a flowchart, one embodiment of a method for processing change data with a change data monitoring system.

The change data monitoring system may use separate performance metric data for the online system in conjunction with the change data to determine the effect of the changes on the performance of the online system. FIG. 10 illustrates, in a flowchart, one embodiment of a method 1000 for processing change data in a change data monitoring system. The change data monitoring system may receive a performance metric from a performance metric monitor for the online system (Block 1002). The change data monitoring system may apply a metric threshold to the performance metric to determine whether the performance metric has failed to meet reasonable standards of performance, by being either greater than or less than the metric threshold (Block 1004). For example, the performance metric monitor may measure a network speed and compare the result to a network speed threshold. Alternately, the performance metric monitor may apply the metric threshold and may alert the change data monitoring system to the result. If the performance metric fails to meet the metric threshold (Block 1006), the change data monitoring system may correlate the timing of the performance metric failure to the change data set (Block 1008). The change data monitoring system may automatically alert a system administrator based on a correlation between the change data set and a performance metric failure (1010). The change data monitoring system may request a data dump from the data source based on a correlation between the change data set and a performance metric failure (1012). The change data monitoring system may receive a data dump from the data source based on the data dump request (1014). The change data monitoring system may present the data dump to the user (1016). The change data monitoring system may apply a data amelioration action based on a correlation between the change data set and a performance metric failure (1018).

Figure 11:
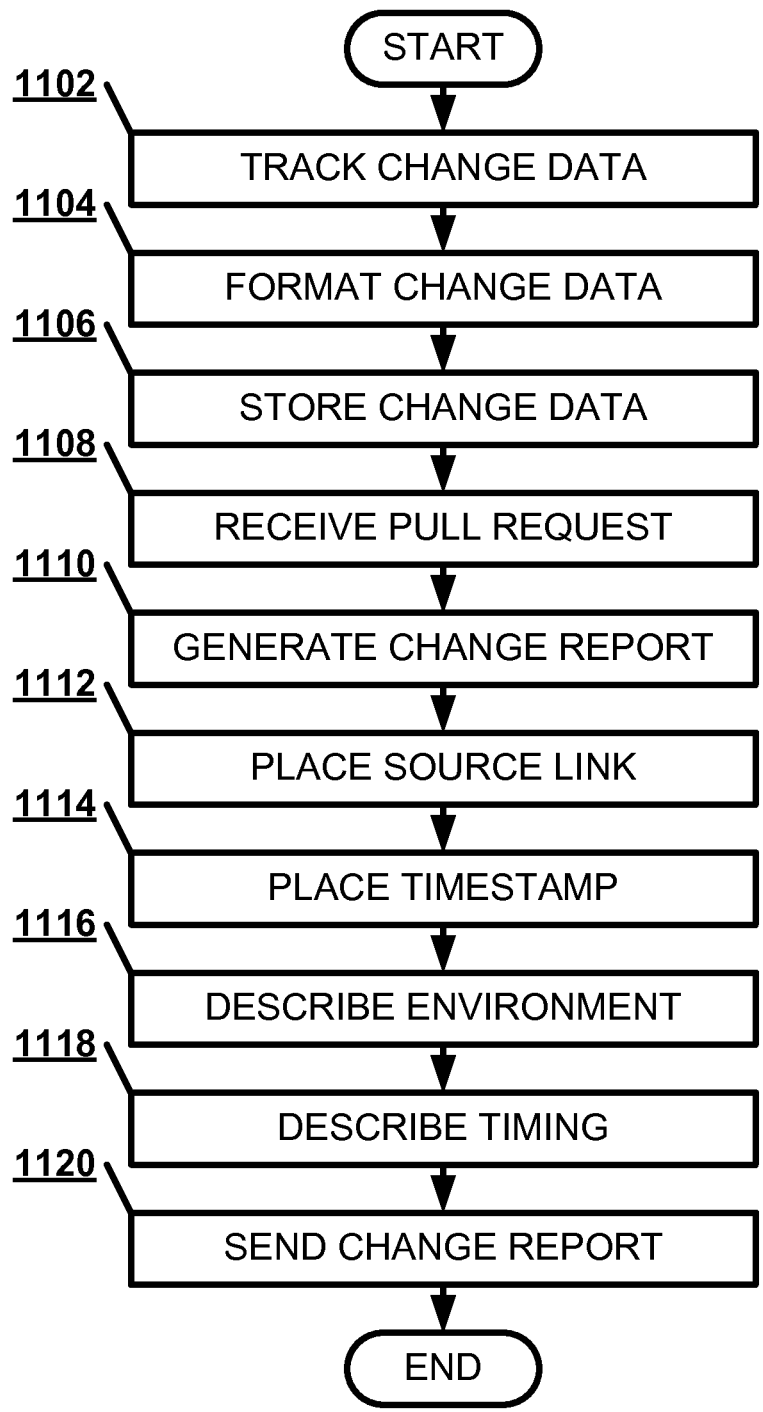
FIG. 11 illustrates, in a flowchart, one embodiment of a method for providing proprietary change data at a data source.

FIG. 11 illustrates, in a flowchart, one embodiment of a method 1100 for providing proprietary change data at a data source. The data source may track change data describing changes made to an online system (Block 1102). The data source may format a change data set in a proprietary source format (Block 1104). The data source may store the change data set describing changes made to the online system in the proprietary source format (Block 1106). The data source may receive a data pull request for the change data set from a change data monitoring system (Block 1108). The data source may generate a change data report describing the change data set (Block 1110). The data source may place a source link to a web interface for the data source in the change data report (Block 1112). The data source may place a timestamp for the change data set in the change data report (Block 1114). The data source may describe the data environment in the change data report (Block 1116). The data source may describe a timing of an action in the change data set as at least one of a past data action, a current data action, and a future data action in the change data report (Block 1118). The data source may send a change data report describing the change data set in the proprietary source format to the change data monitoring system for aggregation and presentation to a user (Block 1120).

Figure 12:
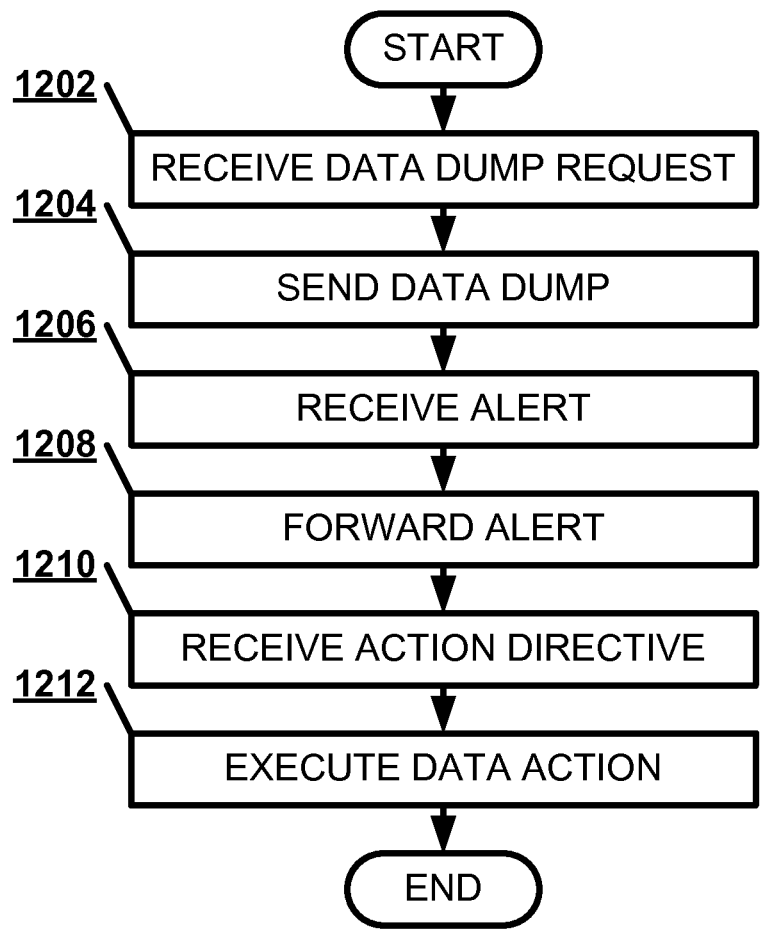
FIG. 12 illustrates, in a flowchart, one embodiment of a method for processing a data dump at a data source.

FIG. 12 illustrates, in a flowchart, one embodiment of a method 1200 for processing a data dump at a data source. The data source may receive a data dump request from the change data monitoring system based on a correlation between the change data set and a performance metric failure (Block 1202). The data source may send the requested data dump to the change data monitoring system (Block 1204). The data source may receive from the change data monitoring system an automatic alert to be forwarded to a system administrator based on a correlation between the change data set and a performance metric failure (Block 1206). The data source may forward the alert to the system administrator (Block 1208). The data source may receive from the change data monitoring system an action directive for a data amelioration action based on a correlation between the change data set and a performance metric failure (Block 1210). The data source may execute the data amelioration action (Block 1212).

Figure 13:
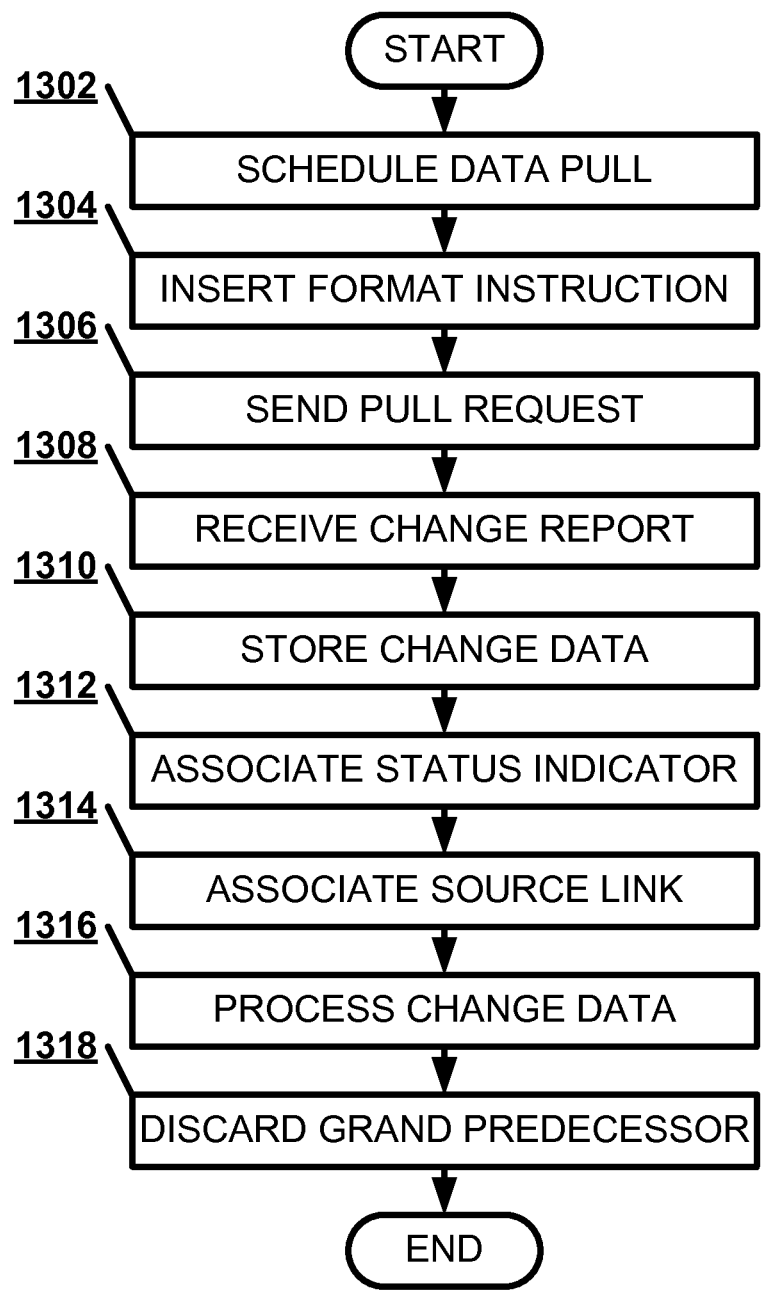
FIG. 13 illustrates, in a flowchart, one embodiment of a method for gathering homogenous change data in a change data monitoring system.

The conversion from the proprietary source format to the standardized data presentation format may occur at either the change data monitoring system or at the data source. FIG. 13 illustrates, in a flowchart, one embodiment of a method 1300 for gathering homogeneous change data in a change data monitoring system. The change data monitoring system may schedule a data pull for the change data set from a data source of a data source set tracking an online system using at least two proprietary source formats (Block 1302). The change data monitoring system may insert a format instruction describing a standardized data presentation format into a data pull request (Block 1304). The change data monitoring system may send a data pull request to the data source at a scheduled data pull interval (Block 1306). The change data monitoring system may receive a change data report having a change data set describing changes made to the online system in the standardized data presentation format from the data source of the data source set tracking the online system (Block 1308). The change data monitoring system may store the change data set in a temporary data store designed to store the change data set no more than a preset storage time period (Block 1310). The change data monitoring system may associate the change data set with a status indicator identifying whether the change data set is within a preset freshness period (Block 1312). The change data monitoring system may associate the change data set with a source link to a web interface for the data source (Block 1314). The change data monitoring system may process the change data set in conjunction with a performance metric to determine a course of action (Block 1316). The change data monitoring system may discard a grand predecessor change data set received from the data source prior to a predecessor change data set and the change data set from the data source upon receiving the change data set (Block 1318).

Figure 14:
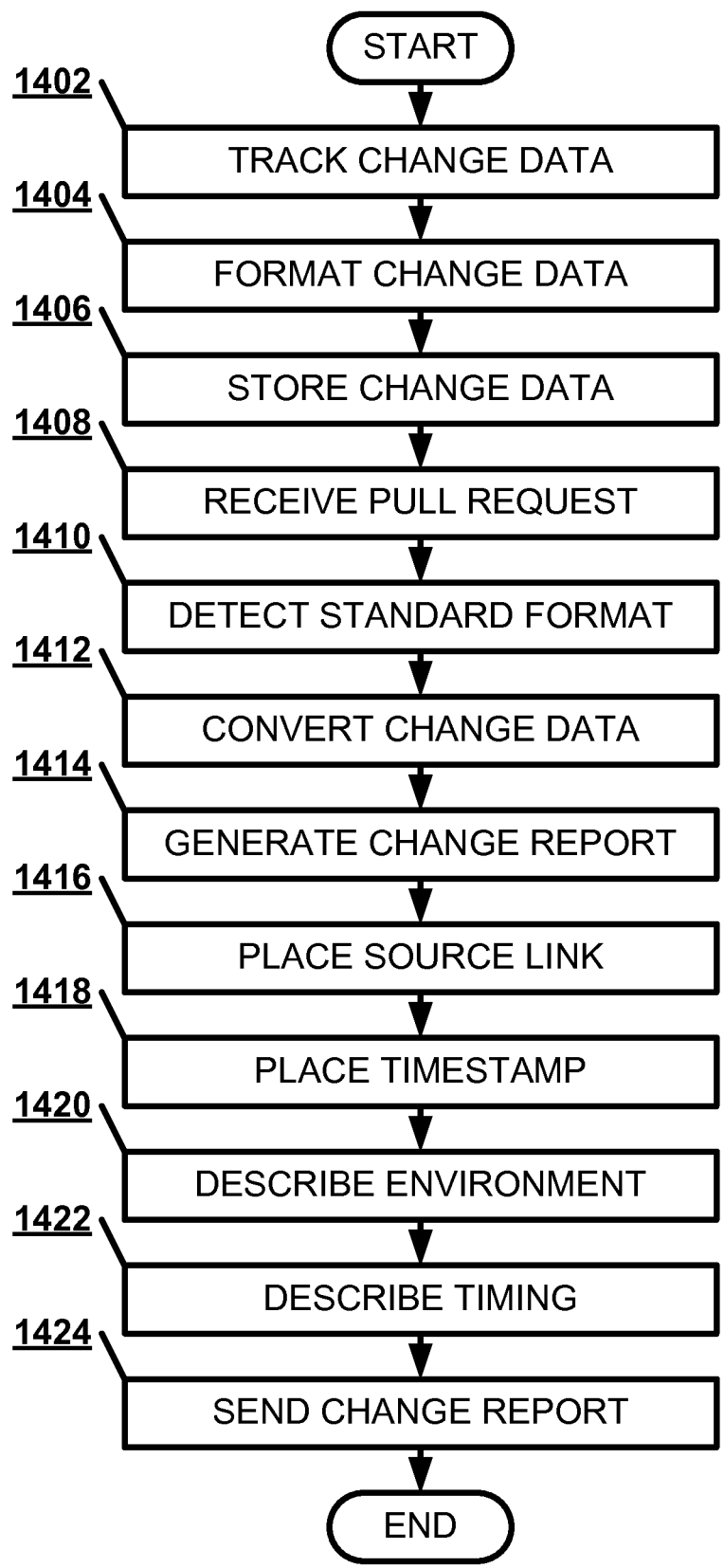
FIG. 14 illustrates, in a flowchart, one embodiment of a method for providing standardized change data at a data source.

FIG. 14 illustrates, in a flowchart, one embodiment of a method 1400 for providing standardized change data at a data source. The data source may track change data describing changes made to an online system (Block 1402). The data source may format a change data set in a proprietary source format (Block 1404). The data source may store the change data set describing changes made to the online system in the proprietary source format (Block 1406). The data source may receive a data pull request detailing a standardized data presentation format for the change data set from a change data monitoring system (Block 1408). The data source may detect a format instruction describing the standardized data presentation format in the data pull request (Block 1410). The data source may convert the change data set to the standardized data presentation format (Block 1412). The data source may generate a change data report describing the change data set (Block 1414). The data source may place a source link to a web interface for the data source in the change data report (Block 1416). The data source may place a timestamp for the change data set in the change data report (Block 1418). The data source may describe the data environment in the change data report (Block 1420). The data source may describe a timing of an action in the change data set as at least one of a past data action, a current data action, and a future data action in the change data report (Block 1422). The data source may send a change data report describing the change data set in the proprietary source format to the change data monitoring system for aggregation and presentation to a user (Block 1424).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A change data monitoring system for monitoring changes in an online system comprising a plurality of data sources having different proprietary source formats, the change data monitoring system comprising:
   a communication interface comprising one or more of a network interface and a transceiver interface, the communication interface configured to receive, from a data source of the plurality of data sources, a change data set describing changes made, changes being made, and changes to be made to the online system in a proprietary source format of a plurality of proprietary source formats used in the online system;
   a processing device having at least one processor configured to
      convert the change data set from the proprietary source format to a standardized data presentation format,
      obtain performance metric data describing network performance of the online system,
      based at least on the performance metric data, identify a correlation between a timing of a performance metric failure and the change data set, and
      based at least on identifying the correlation between the timing of the performance metric failure and the change data set, output via the communication interface an alert regarding a correlation between the performance metric failure and the change data set; and
   an output device configured to output the change data set in the standardized data presentation format, the change data set presented based on timing data sorting the change data set into one or more past data actions, one or more current data actions, and one or more future scheduled data actions.

2. The change data monitoring system of claim 1, wherein the processing device is configured to execute a data pull module to schedule a data pull for the data source.

3. The change data monitoring system of claim 1, further comprising:
   a temporary data store configured to store the change data set.

4. The change data monitoring system of claim 1, further comprising:
   a temporary data store configured to associate the change data set with a source link to a web interface for the data source.

5. The change data monitoring system of claim 1, further comprising:

a temporary data store configured to associate the change data set with a status indicator identifying whether the change data set is within a preset freshness period.

6. The change data monitoring system of claim 1, wherein the processing device is configured to discard a grand predecessor change data set received from the data source prior to a predecessor change data set and the change data set from the data source upon receiving the change data set.

7. The change data monitoring system of claim 1, wherein the processing device is configured to organize the change data set based upon a data environment for the data source.

8. The change data monitoring system of claim 1, wherein the processing device is configured to organize the change data set as at least one of a past data action, a current data action, and a future data action.

9. The change data monitoring system of claim 1, wherein the communication interface is configured to request a data dump from the data source based at least on the correlation between the change data set and the performance metric failure.

10. The change data monitoring system of claim 1, wherein the communication interface is configured to automatically alert a system administrator based at least on the correlation between the change data set and the performance metric failure.

11. The change data monitoring system of claim 1, wherein the processing device is further configured to, based at least on correlating the timing of the performance metric failure to the change data set, apply a data amelioration action for the performance metric failure.

12. A computing device, having a memory to store a change data set describing changes made, changes being made, and changes to be made to an online system in a proprietary source format, the computing device configured to
   receive a data pull request for the change data set detailing a standardized data presentation format from a change data monitoring system;
   send a change data report describing the change data set in the proprietary source format to the change data monitoring system for aggregation and presentation to a user, the change data report presenting the change data set based on timing data sorting the change data set into one or more past data actions, one or more current data actions, and one or more future scheduled data actions;
   receive from the change data monitoring system a data dump request and an action directive for a data amelioration action based at least on a correlation between the change data set and a performance metric failure, the data amelioration action comprising an action to fix the performance metric failure; and
   execute the data amelioration action.

13. The computing device of claim 12, wherein the computing device is further configured to place a source link to a web interface for a data source in the change data report.

14. The computing device of claim 12, wherein the computing device is further configured to place a timestamp for the change data set in the change data report.

15. The computing device of claim 12, wherein the computing device is further configured to describe a data environment in the change data report.

16. The computing device of claim 12, wherein the computing device is further configured to describe a timing of an action in the change data set as at least one of a past data action, a current data action, and a future data action in the change data report.

17. The computing device of claim 12, wherein the computing device is further configured to receive from the change data monitoring system an automatic alert to be forwarded to a system administrator based at least on the correlation between the change data set and the performance metric failure.

18. A machine-implemented method, comprising:
   scheduling, in a change data monitoring system, a first data pull for a first data source that uses a first proprietary source format for tracking changes to an online system and a second data pull for a second data source that uses a second proprietary source format for tracking changes to the online system;
   receiving, from the first data source, a first change data set describing, in the first proprietary source format, changes made, changes being made, and changes to be made to an online service;
   converting the first change data set from the first proprietary source format to a standardized data presentation format;
   receiving, from the second data source, a second change data set describing, in the second proprietary source format, changes made, changes being made, and changes to be made to the online system;
   converting the second change data set from the second proprietary source format to the standardized data presentation format;
   obtaining performance metric data describing a performance metric of the online system;
   applying a performance metric threshold to the performance metric for the online system;
   when the performance metric for the online system is less than the performance metric threshold, then identifying a correlation between a timing of a performance metric failure and one or more of the first change data set and the second change data set, and presenting the first change data set and the second change data set in the standardized data presentation format to a user; and
   when the performance metric for the online system is not less than the performance metric threshold, then presenting the first change data set and the second change data set in the standardized data presentation format to the user, each of the first change data set and the second change data set presented based on timing data sorting each of the first change data set and the second change data set into one or more past data actions, one or more current data actions, and one or more future scheduled data actions.

19. The method of claim 18, further comprising:
   discarding a first grand predecessor change data set received from the first data source prior to a first predecessor change data set and the first change data set upon receiving the first change data set.

* * * * *